United States Patent
Sommer et al.

(10) Patent No.: US 11,014,276 B2
(45) Date of Patent: May 25, 2021

(54) METHOD AND DEVICE FOR PRODUCING A FOAM PARTICLE PART

(71) Applicant: Kurtz GmbH, Kreuzwertheim (DE)

(72) Inventors: Harald Sommer, Hasloch am Main (DE); Walter Kurtz, Hasloch am Main (DE); Norbert Reuber, Bergrothenfels (DE)

(73) Assignee: Kurtz GMBH, Kreuzwertheim (DE)

( * ) Notice: Subject to any disclaimer, the term of this patent is extended or adjusted under 35 U.S.C. 154(b) by 950 days.

(21) Appl. No.: 14/765,503

(22) PCT Filed: Feb. 20, 2014

(86) PCT No.: PCT/EP2014/053325
§ 371 (c)(1),
(2) Date: Aug. 3, 2015

(87) PCT Pub. No.: WO2014/128214
PCT Pub. Date: Aug. 28, 2014

(65) Prior Publication Data
US 2016/0001476 A1 Jan. 7, 2016

(30) Foreign Application Priority Data

Feb. 20, 2013 (DE) .................... 10 2013 002 849.3
Jul. 26, 2013 (DE) .................... 10 2013 108 053.7

(51) Int. Cl.
*B29C 44/44* (2006.01)
*B29C 44/34* (2006.01)
(Continued)

(52) U.S. Cl.
CPC ........ *B29C 44/445* (2013.01); *B29C 44/3426* (2013.01); *B29C 44/3496* (2013.01);
(Continued)

(58) Field of Classification Search
CPC .................................................. B29C 44/343
See application file for complete search history.

(56) References Cited

U.S. PATENT DOCUMENTS

| 4,822,542 A | 4/1989 | Kuwabara et al. |
| 6,220,842 B1 | 4/2001 | Kamiyama et al. |

FOREIGN PATENT DOCUMENTS

| DE | 1 243 123 B | 6/1967 |
| DE | 1 704 984 A1 | 2/1972 |

(Continued)

OTHER PUBLICATIONS

Office Action, dated Jan. 16, 2014, from counterpart German Application No. DE 10 2013 108 053.7, filed on Jul. 26, 2013.
(Continued)

*Primary Examiner* — Stella K Yi
(74) *Attorney, Agent, or Firm* — HoustonHogle LLP

(57) ABSTRACT

The invention relates to a method and an apparatus for the production of a foam particle part. The method comprises the following steps:
feeding of foam particles from a material container to a mould by means of a pipe
thermoplastic welding of the foam particles in the mould to make a foam particle part with the input of heat,
wherein steam is added to the foam particles to be fed.

16 Claims, 2 Drawing Sheets

Figure 1:
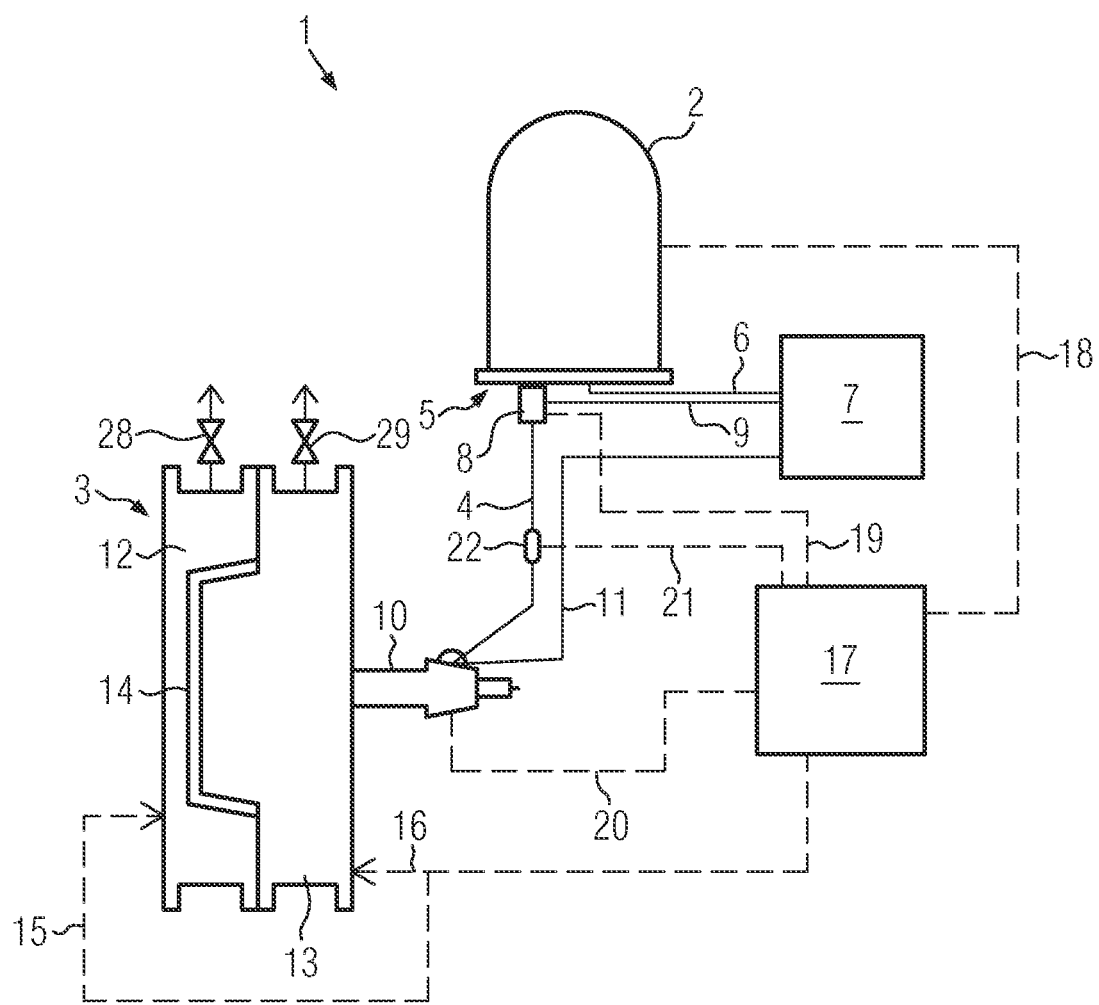

(51) Int. Cl.
    *B29K 75/00*       (2006.01)
    *B29K 105/04*      (2006.01)
    *B29K 105/00*      (2006.01)

(52) U.S. Cl.
    CPC ...... *B29K 2075/00* (2013.01); *B29K 2105/04* (2013.01); *B29K 2105/251* (2013.01)

(56) References Cited

FOREIGN PATENT DOCUMENTS

| | | |
|---|---|---|
| DE | 2 243 123 A1 | 3/1973 |
| DE | 10 2005 050 411 A1 | 4/2007 |
| DE | 10 2009 029 286 A1 | 4/2010 |
| EP | 0 496 015 A1 | 7/1992 |
| EP | 1 813 408 A1 | 8/2007 |
| EP | 1813408 A1 * | 8/2007 |
| FR | 2 149 529 A1 | 3/1973 |
| GB | 1 110 350 | 4/1968 |
| GB | 1 402 115 | 8/1975 |
| GB | 1 403 392 | 8/1975 |
| WO | 94/20568 A1 | 9/1994 |
| WO | 00/44821 A1 | 8/2000 |
| WO | 2008/087078 A1 | 7/2008 |
| WO | 2010/010010 A1 | 1/2010 |
| WO | 2012/065926 A1 | 5/2012 |
| WO | 2013/013764 A2 | 1/2013 |
| WO | 2013/013784 A1 | 1/2013 |
| WO | 2013/182555 A1 | 12/2013 |
| WO | 2014/011537 A1 | 1/2014 |

OTHER PUBLICATIONS

Search Report, dated Jan. 31, 2014, from counterpart German Application No. DE 10 2013 110 242.5, filed on Feb. 20, 2013.
International Search Report, dated Jun. 26, 2014, from counterpart International Application No. PCT/EP2014/053325, filed on Feb. 20, 2014.
International Preliminary Report on Patentability, dated Aug. 25, 2015, from counterpart International Application No. PCT/EP2014/053325, filed on Feb. 20, 2014.
English Translation of the Written Opinion of the International Searching Authority, dated Aug. 25, 2015, from counterpart International Application No. PCT/EP2014/053325, filed on Feb. 20, 2014.

* cited by examiner

METHOD AND DEVICE FOR PRODUCING A FOAM PARTICLE PART

RELATED APPLICATIONS

This application is a § 371 National Phase Application of International Application No. PCT/EP2014/053325, filed on Feb. 20, 2014, now International Publication No. WO 2014/128214 A1, published on Aug. 28, 2014, which International Application claims priority to German Applications 102013002849.3, filed Feb. 20, 2013, and 102013108053.7, filed Jul. 26, 2013, all of which are incorporated herein by reference in their entirety.

The present invention relates to a method and an apparatus for the production of a foam particle part. In particular the present invention relates to a method and an apparatus for the production of a foam particle part from expandable particles based on thermoplastic polyurethane.

Foam particle parts based on thermoplastic polyurethane are known from WO 94/20568. These foam particle parts are made from expandable particle-shaped thermoplastic polyurethanes. For moulded part production, the pre-expanded, where applicable pressure-charged thermoplastic polyurethane particles are placed in a heatable mould, and heated sufficiently for the particles to become welded together. The heating is effected through the application of steam. If necessary, the particles may be pressure-charged before moulded part production. After demoulding, the part should be conditioned until it has reached a constant weight. Conditioning takes place at temperatures of 20-120° C. The thermoplastic polyurethane particles may be provided with a blowing agent, such as for example butane or $CO_2$. Solid blowing agents may also be used, which split off gas under heating, such as azocarbonamide or toluene-p-sulphonic acid hydracite.

Known from WO 2014/011537 is a method for the production of shoe soles from thermoplastic polyurethane foam particles.

Other methods of producing foam particle parts are disclosed in DE 1 243 123 A, DE 1 704 984 A, U.S. Pat. Nos. 4,822,542 and 6,220,842 B1.

The advantage of foam particle parts made of particles based on thermoplastic polyurethane (TPU particles) lies in their high elasticity in comparison with foam particle parts based on other plastics, in particular polystyrol and polypropylene.

Great efforts have therefore been made to make such foam particle parts based on polyurethane accessible to mass production. In particular such particle foams based on polyurethane are, because of their mechanical properties, of very great interest for shoe soles.

Foamed soles based on thermoplastic polyurethane are disclosed in DE 10 2005 050 411 A1. The use of foamed thermoplastic polyurethane for footwear is also known from WO 00/44821.

The manufacture of soles for shoes from foamed particles of thermoplastic polyurethane is also disclosed in WO 2012/065926 A1. Here the foamed polyurethane particles are embedded in a matrix material made of polyurethane foam, thus creating a hybrid material. Because of the properties of the foamed polyurethane particles, the soles have good damping properties, may be bent with minimal force, and have high rebound resilience.

WO 2008/087078 A1 discloses a further hybrid material containing a matrix of polyurethane, with foamed particles of thermoplastic polyurethane contained therein, together with a method of producing such hybrid materials. These hybrid materials are used for cycle saddles, cushioning and soles for shoes.

Described in WO 2013/013764 A1 is a further method for the manufacture of a sole or a part of a sole of a shoe, in which the sole is made of foamed thermoplastic polyurethane based on urethane (TPU, E-TPU, TPU-E) and/or on the basis of polyether-block-amide (PEBA). The foam particles are preferably linked by a binder. As binder, a two-component polyurethane system is used.

In addition, DE 10 2009 029 286 A1 discloses polyurethane soles for shoes which are made of a polyurethane integral foam.

Disclosed in WO 2010/010010 A1 are expandable thermoplastic polymer blends containing blowing agent, also thermoplastic polyurethane (TPU) and styrene polymer. The preferred percentages by weight of thermoplastic polyurethane lie between 5 and 95 and the percentages by weight of styrene polymer between 5 and 95, with the percentages by weight of thermoplastic polyurethane and styrene polymer adding up to 100 parts. The polymer blend may contain a further thermoplastic polymer. Known from WO 2013/182555 A1 is a method of producing a foam particle part from thermoplastic polyurethane particles, in which the foam particles are wetted in water containing lubricant for conveyance in a gas flow. This is intended to prevent the particles from sticking together during movement. The foam particles are sprayed with water by nozzles.

To summarise, it may be stated that for a long time intensive efforts have been made to produce foam particle parts based on thermoplastic polyurethanes (WO 94/20568 A1), since such plastics have special mechanical properties in respect of elasticity, rebound resilience and flexibility. There are different solutions to the production of such plastic bodies. It has also been proposed to embed the polyurethane particles in a hybrid material (WO 2008/087078 A1 WO 2012/065926 A1, WO 2013/013784 A1).

In principle it would be easier and more cost-effective to weld the foam particles together without an additional matrix, as is the case with hybrid materials. Foam particle parts of polypropylene or polystyrol have long been produced in large-scale industrial applications without an additional matrix, by welding the foam particles. There are already sports shoes on the market in which the sole is made of a polyurethane-based foam particle part and with no matrix material used to bind the particles. These sports shoes are however very expensive. This is due on the one hand to their exceptional mechanical properties and on the other hand to the limited available quantity, since the production of foam particle parts of expandable thermoplastic polyurethane particles (eTPU particles) involves, as before, considerable problems. Since eTPU particles have high mutual adhesion forces, individual particles adhere to one another loosely and form lumps. This impairs the metering and filling processes. With the methods known to date, it is not possible to implement stable mass production of foam particle parts based on eTPU particles. Compared with production of foam particle parts based on other materials, the reject rate is considerably higher, and throughput is low.

The invention is therefore based on the problem of creating a method and an apparatus for the production of a foam particle part, in which a mould may be filled reliably and completely with foam particles, even if the foam particles have high mutual adhesion forces, as is the case for example with foam particles based on polyurethane.

The problem is solved by a method and an apparatus according to the independent claims. advantageous developments are set out in the respective dependent claims.

The method according to the invention for the production of a foam particle part comprises the following steps:
Feeding of foam particles from a material container to a mould by means of a pipe, wherein the foam particles are conveyed in the pipe by a blowing agent, and
Thermoplastic welding of the foam particles in the mould to form the foam particle part under a supply of heat.

The method is distinguished by the fact that steam is added to the foam particles to be fed.

Through the addition of steam to the foam particles to be fed, the latter are wetted with steam during their transfer from the material container to the mould, thereby improving their anti-friction properties. The wetting of the surface of the foam particles leads to a reduction of adhesion forces, so that the risk of lump-forming of the foam particles is minimal.

The addition of steam effects uniform wetting of the foam particles. The amount of steam may be so metered that all foam particles are evenly wetted, while the foam particles are not activated and do not coalesce with one another.

The supplying of steam may be effected in the material container and/or at one or more points along the pipe.

The addition of steam also effects a heating of the foam particles, so that the latter are already pre-heated when they reach the mould. Because of this, the thermoplastic welding of the foam particles is effected more quickly and more reliably.

Air is the preferred blowing gas, since it is cheap and has all the required physical properties. Instead of aft, an inert gas may also be used, such as e.g. carbon dioxide. Steam is unsuitable as the sole blowing gas, since it would activate the foam particles, leading them to clog in the pipe. In addition, a large part of the steam would condense, thereby generating a considerable drop in pressure. Movement of the foam particles would not be ensured. Moreover, the amount of water fed to the mould would be considerable, which would impair welding of the foam particles.

The foam particles are fed to the mould from the material container along a conveyance path, wherein preferably steam is added to the foam particles at several points along the conveyance path. The amount of heat fed with the steam is so measured that the foam particles are not fully activated before reaching the mould and are already welded to one another along the conveyance path. Consequently the amount of steam is metered precisely. The amount of steam to be supplied depends on various parameters, e.g. the flow volume of the foam particles to be supplied, the cross-sectional area and the geometry of the pipes, the material of the foam particles, etc. The setting of the amount of steam added is effected by setting the amount of steam supplied by at least one nozzle by which it is fed into the line of the conveyance path. Here the cross-sectional area of the nozzle orifice is also to be taken into account. In principle it is also possible to adjust the steam by altering the size of the orifice of the nozzle.

With the addition of steam, this condenses for the most part on the foam particles. Since, with the condensation of the steam, the latter reduces in volume, the addition of steam to the flow comprising the blowing gas and the foam particles leads to no or else only very slight increase in pressure. Consequently, through the addition of steam, in particular at several points in the pipeline, the flow dynamics are changed hardly at all as compared with a conventional system with no added steam.

There are material compositions based on polyurethane which already become tacky at 50° C. Foam particles made of such eTPU should therefore not be heated above 50° C. in the area of the conveyance path. With other material compositions based on polyurethane, higher temperatures are possible.

Since on the one hand the foam particles should not be heated in the conveyance path above a certain temperature, and on the other hand steam should be present during the whole conveyance path, it is advantageous to supply steam at several points along the conveyance path. In this way, it is also possible to replace steam which has already condensed, so that a roughly even admission of steam is obtained along the conveyance path.

Preferably the amount of steam is set so that a thin film of condensed water forms on the surface of all foam particles and lowers the adhesion effect of the hydrogen particles. The more steam is added, the more intensely the surfaces of the foam particles are wetted. However, with the addition of steam, heat is also supplied; the amount of heat may not be so great that the surfaces of the foam particles are activated. Therefore, in determining the amount of steam, the opposing requirements of wetting and avoidance of activation must be balanced.

Through the addition at several points along the conveyance path, the film is repeatedly refreshed, so that reliable conveyance of the foam particles is provided if possible over the whole conveyance path.

The steam is added to the foam particles preferably in the material container and/or at a blowing nozzle located downstream of the material container in the direction of conveyance, and/or at a filling injector upstream of the mould in the direction of conveyance, and/or at one or more sections of the pipeline. In particular, addition takes place at points or in areas ahead of curves and/or constrictions of the line from the material container to the mould.

The steam is preferably added at a temperature of 100 to 140° C.

When added to the foam particles, the steam is preferably under a pressure corresponding to the pressure in the vessel (material container or conveyor pipe) in which the foam particles are present.

The amount of steam added (at 100° C. and 1 bar) comes to around 20 to 500 times the volume of the mould cavity of the mould.

Preferably the foam particles are conditioned under increased pressure, with the conditioned foam particles being added to the material container and held there under a certain pressure. The pressure in the material container lies preferably in the range between 2 and 5 bar. Through the conditioning of the foam particles they are charged with air, which acts as blowing agent. Since conditioning takes place gradually, for example over a period of 2 to 24 hours, the compressed foam particles retain a smooth surface.

During feeding of the foam particles from the material container to the mould, the pressure in the pipeline in the mould is adjusted so that it is somewhat lower than in the material container. By this means, on the one hand a flow is generated from the material container to the mould, and on the other hand due to the pressure the foam particles are kept small, so that they collide with one another as little as possible, and the risk of them adhering to one another and forming lumps is kept to a minimum. In the mould, the pressure is preferably around 0 to 3 bar, and in particular around 0.2 to 1 bar less than in the material container. When blowing air is used, the foam particles may even be conveyed against a counter-pressure. Accordingly, the pressure in the material container may be around 0.05 to 0.15 lower than in the mould.

The foam particles may be separated in the material container. Separation is effected for example by feeding a gas or air and/or steam flow, which swirls the foam particles around in the material container. This gas flow is described below as the fluidisation flow. Instead of or in combination with swirling around, it is also possible to provide for separation of the foam particles, separation rollers, a star feeder lock, a rotating chamber, a screen plate (intermediate bottom) through which the particles are pressed owing to a difference in pressure or (vibrating) movement, and/or screw filling.

The foam particles are, preferably firstly separated, fed to the conveyor pipe and in the conveyor pipe transported in a gas flow, in particular an airflow, which is enriched with steam, spaced apart as much as possible, so that the individual foam particles reliably pass along the conveyance path and into the mould.

The means and effects which counteract lump-forming during transport are listed below, and may be applied separately or in combination:

Adding steam to the foam particles, which lowers the adhesive capability of the foam particles and increases their anti-friction properties Conveyance of the foam particles under increased pressure, by means of which they can be kept small, while the packing density in the pipeline may be kept low and at the same time a high flow of expanding foam particles per unit of time is obtained. The foam particles may be conditioned before conveyance or also conveyed unconditioned under pressure Separation of the foam particles in the material container, so that the foam particles are conveyed through the pipeline with the least possible contact with other foam particles Coating of the foam particles with a lubricant, e.g. wax Blowing-in of a powder/dust as a lubricant for the foam particles to be conveyed Movement, in particular vibration, of the pipeline and/or the mould during filling.

For this purpose the pipeline is preferably in the form of a flexible hose.

Since the transport of the foam particles is a stochastic system, it is not possible to prevent individual foam particles from coming into contact with one another completely. The addition of steam to the foam particles prevents the foam particles which come into contact with one another from adhering to one another permanently, clogging and blocking the pipeline or areas of the mould.

In principle it is also possible to use unconditioned foam particles and/or to fill the mould without doing so under pressure. Then it is expedient for the mould to comprise at least two parts, movable relative to one another, so that the mould cavity after it has been filled may be reduced by moving the two parts together, in order to compress the foam particles it contains. Such a mould is also described as a crack-split mould. A crack-split mould may also in principle be provided in combination with pressure filling, in which case however the compaction from moving together the two parts of the mould is executed over only a short distance, since a high filling density is already obtained from the pressure filling. For some plastic bodies, high compaction from a crack-split mould is disadvantageous. This applies in particular to plastic bodies with varying thickness, since thinner sections are compacted significantly more than thicker sections. Such uneven compaction is normally not desired. Moreover, anisotropic shrinkage behaviour occurs, with less shrinkage in the closing direction of the crack-split.

For pressure filling, the mould is designed with a tight mould cavity, with pressure valves connected to the mould cavity and from which the blowing or filling air escapes during filling of the mould, on reaching a certain pressure.

The steam supplied for transport of the foam particles is preferably a saturated steam, i.e. a saturated, dry steam. On cold surfaces, such as the not yet heated foam particles, the steam condenses to water. Since the steam reduces considerably in volume on condensation to water, there are no pressure or volume problems from the supplying of steam.

The foam particles are preferably made of expandable thermoplastic polyurethane (eTPU). The thermoplastic polyurethane may be a polymer blend containing a predetermined polyurethane content. Such a polymer blend is known from WO 2010/010010 A1. The polymer blend contains preferably a percentage by weight of at least 5% of polyurethane and in particular preferably at least 50% polyurethane. The foam particles may also be made from a polymer blend with a percentage by weight of at least 80% or 90% polyurethane. With regard to the formation of the polymer blend, full reference is made to WO 20101010010 A1.

The foam particles may be provided with a blowing agent. Suitable blowing agents are for example pentane, butane or $CO_2$ or mixtures thereof. Solid blowing agents such as azocarbonamide or toluene-p-sulphonic acid hydracite may also be used. It is also possible to use foam particles which have no blowing agent.

Further aspects of the invention which, in combination with the methods explained above or also independent of the methods explained above, prevent lump-forming or bridging of foam particles during conveyance to the mould, are outlined below.

In order, in particular, to prevent such bridging, a release agent or lubricant may be fed to the foam particle feedstock. This may be effected for example by the blowing in of gases, in particular air, or gas/solid body mixtures, for example fine dust. Here this introduction may be made in the filling container or directly into the filling flow or filling section.

A further possibility for preventing undesired bridging is to admix a lubricant additive in the form of a wax. Here too this may be done in the silo as well as in the filling section. The amount of admixed wax lies preferably between 0.05 and 0.5 percentage by weight based on the amount of foam particles. Preferably the wax is fed to the foam particles together with the steam.

According to a further aspect, undesired bridging may be prevented or bridges already formed may be broken up by mechanical movement of the filling section, at least in places, in particular by jogging it or subjecting it to vibration.

In addition, the precise metering of the foam particles into the described conveyance flow also offers a means of preventing bridging.

This occurs for example by means of the particles being separated for metering by two encapsulated brush rollers working in opposite directions beneath the filling container. Another means of separating the particles may be obtained by the arrangement of a similarly encapsulated revolver-like rotating drum with axially aligned bores, to hold the particles in chambers beneath the filling container. These chambers of the drum may then be filled exactly and, after rotation of the drum, the contents of the individual chambers may be delivered consecutively into the conveyed flow. Alongside the separation, a volumetric metering of the particles to be conveyed into the cavity may also be achieved by this means.

Filling may preferably be carried out as a counter-pressure filling process, wherein both a filling injector and also a mould cavity of the mould are subjected to pressure. By setting a pressure difference, the density of the moulded part may also be controlled.

The counter-pressure filling process may be linked to conditioning, in particular in the form of pressure charging before the actual filling process.

According to a further typical embodiment of the invention, the ETPU particles are preferably evacuated in a separate container before pressure filling. This leads initially to increased volume of the individual particles, combined with a more powerful reduction in volume during subsequent pressure filling in comparison with conventional pressure filling, thereby making easier filling possible.

As an alternative to pressure or counter-pressure filling, according to a further embodiment of the invention, the mould may be filled by the crack-split method.

Compaction may at the same time be effected evenly over the entire mould. According to a further preferred embodiment however, at least one mould half may be made of several sections, which may be actuated separately from one another, i.e. may be moved in the direction of the opposite mould half. Here the compaction in the different sections may be set independently.

A further filling method which may be used is that of screw filling or sheet filling. Here the foam particle material is fed into the mould over a screw conveyor or a sheet extruder, while the foam particles may also be dispersed in water as carrier material.

In order to obtain in particular a constant weight of the finished part with complete and even filling of the mould, advance or intermediate metering of the foam particle material may take place before the actual filling process or in the filling section. Here the metering may be made using a gravimetric, volumetric or combined method. According to an especially preferred embodiment, first a desired amount is determined by gravimetric means, followed by a check as to whether the volume of the weighed desired amount lies between a preset minimum and a similarly preset maximum value. Here the minimum value corresponds to the amount by which the mould is only just completely filled, and the maximum value to the amount which may only just be fed into the mould.

In comparison with conventional foamable materials made of particles, ETPU has much greater density. Accordingly, the density of ETPU lies regularly in the range between 120 and 200 g/l, whereas the density for example of EPS and EPP lies in the range between 15 and 50 or 20 to 120 g/l. This leads to the fact that, for foaming and welding of the ETPU particles, a considerably greater energy or heat input is required. The particles may be preheated before or during filling, in particular by steam, wherein this is preferably effected by waste heat occurring at the processing stage. Alongside the reduction in the heat requirement, the particles are also softer and more easily compressed.

In order to reduce the adhesion force of the particles relative to the surfaces of the filling device, in particular the filling tube, and to avoid an undesired abrasion of the particles on these surfaces, the surfaces are preferably made smooth and of an oxidation-free or at least low-oxidation material, or coating of this kind. Thus, for example, the filling pipe may be a stainless steel tube with a polished inner surface.

The filling section or filling pipe, according to a further embodiment, is cleaned regularly, in particular after each filling operation, for example being rinsed with a cleaning fluid. If the filling of the mould through pressure filling takes place at comparatively high filling pressure, i.e. regularly a combination of filling container pressure, fluidising air pressure and/or back pressure, then the volumes of the spandrels, which are necessary for through passage of the steam and with it the heating of the particles, are much reduced. Thus for example with a degree of compression of the ETPU particles of more than 150%, it is scarcely still possible to use a classical cross steaming method, since the heat input is effected only heavily reduced due to heat transmission on the particle surfaces facing the spandrel volumes, but instead through heat conduction between the particles themselves. This leads on the one hand to much extended steaming times and on the other hand it is not possible to rule out burnt surfaces at the points at which the steam is introduced into the mould. The same problem may occur when filling takes place by the crack-split method and on closing the mould, powerful compression takes place due to high split dimensions.

So that this problem may be at least reduced, according to one embodiment, after filling and closing of the mould, the heat input is made not through conventional cross steaming from one side, but instead cross steaming is initiated from two opposite sides of the mould into the mould cavity and forming a back pressure. The pressure on a moving and fixed side of the mould is built up actively by opening the steam valves on the moving and fixed side simultaneously. By this means the particles are firstly somewhat compressed, so that spandrels again occur and the particle feedstock is again permeable to steam. The necessary through flow is generated, as with conventional cross steaming, by different pressures on the moving and fixed side. Through the pressure difference and pressure level, temperature, degree of compression of the particles and steam flow, i.e. the energy input into the material, are controlled. The simultaneous opening of the steam valves on the moving and fixed side is expedient, since otherwise the steam required on the back pressure side, due to the condensation on cold tool walls and volume filling, flows through the part and welds the surface before the particles are compressed by the pressure build-up, so that the desired spandrels can no longer be generated.

So that the cross flow occurs not only as a result of condensation, the outlet on the side with the lower pressure may be regulated or closed on a cyclic basis to a somewhat lower pressure (0.1 . . . 0.3 bar) than the inlet pressure of this side. While the outlet is regulated at the lower pressure, the inlet is closed, so that steam does not flow from top to bottom inside the chamber, but instead flows from the second steam chamber transversely through the moulded part.

According to a further embodiment of the invention, the feeding in of the cross steam introduced from both sides of the main plane of the moulded part may take place either on both sides simultaneously or also offset in time. It may be especially advantageous if the cross steaming can take place intermittently from both sides in a kind of ping-pong effect. This means in particular that the steam flow changes its direction in the moulded part several times. In this way it is possible to obtain especially good rinsing and an especially homogenous temperature distribution.

Further homogenisation of the temperature distribution may be obtained if, according to a further embodiment of the invention, the steam is introduced directly into the mould cavity through at least one needle-like steam injector. This may be advantageous in particular in the case of complex moulded part geometry, in order to supply sufficient steam to points which are otherwise difficult to access.

In particular when filling takes place using the crack-split method, steaming may also be effected via the split. Here the compaction may take place during steaming or also in the autoclave state, i.e. after completion of steaming, while the compaction may also in turn be effected on a sectional basis.

Following completion of the steaming process, cooling and stabilisation of the moulded part may be effected, in an essentially known manner, before the part is removed after opening of the mould. In particular, at the same time, cooling may be effected at intervals, while cooling and/or stabilisation may also take place with vacuum support.

Demoulding may be effected in a basically known manner, for example using suction plates which, through partial vacuum, create a force fit with the mould lines. It has however been found that ETPU moulded parts can rest very firmly in the mould, so that the force applied by suction is insufficient. According to a further embodiment of the invention it is therefore provided that demoulding is effected using mechanical grippers or needles with a spreader effect, which penetrate the finished part and hook into it releasably.

Figure 2:
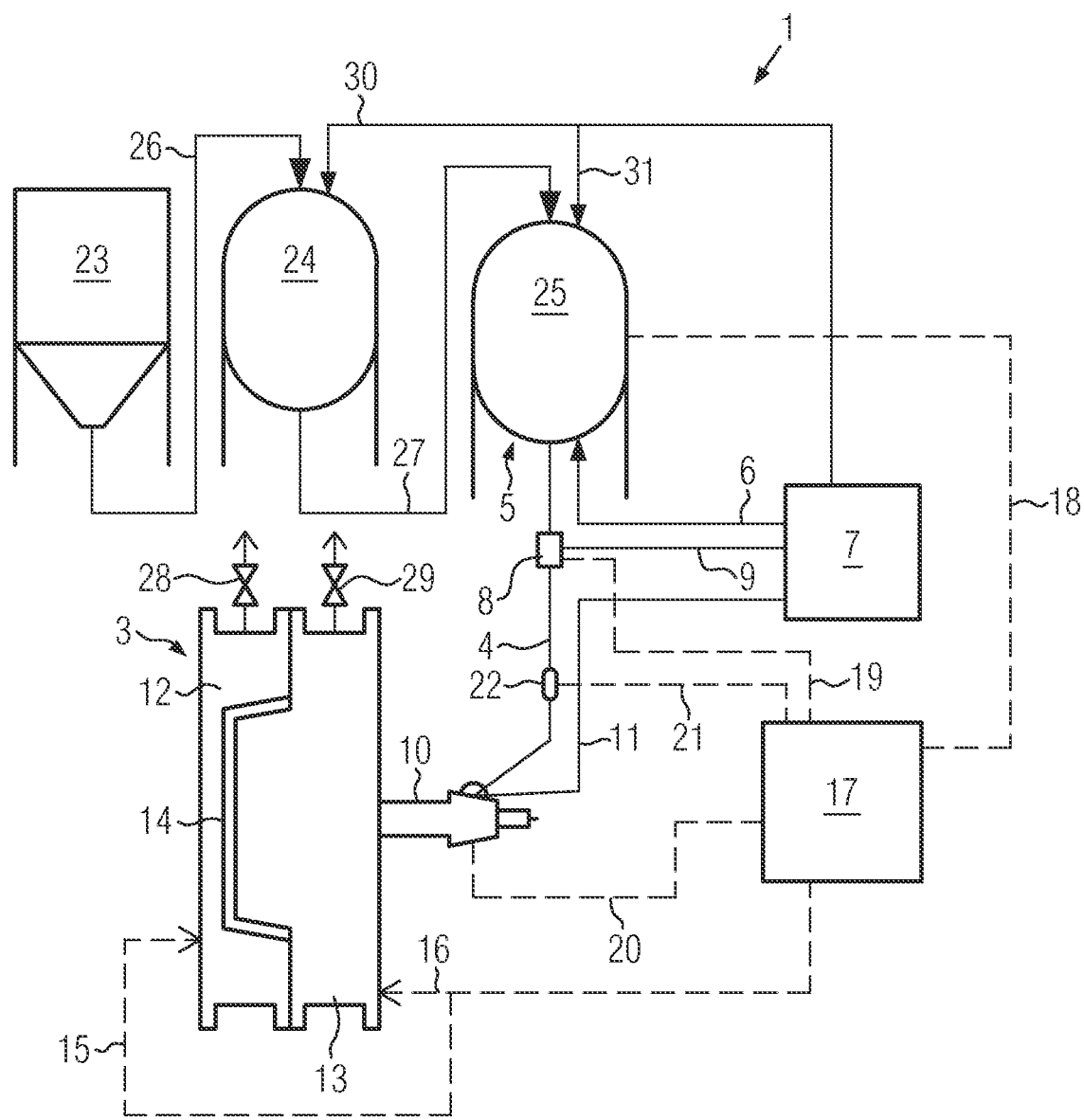

The invention will be explained in detail below with the aid of the embodiments shown in the drawings, namely in:

FIG. 1 a schematic block diagram of an apparatus for the production of a foam particle part, and FIG. 2 a schematic block diagram of an apparatus for the production of a foam particle part, with counter-pressure filling of a mould.

A first embodiment of an apparatus 1 for the production of a foam particle part is shown in FIG. 1.

This apparatus 1 comprises a material container 2, a mould 3 and a pipe 4 which leads from the material container 2 to the mould 3.

The material container 2 is used to hold loose foam particles. The material container 2 has a base 5, and is connected in the base area via a compressed air line 6 to a compressed air source 7. The compressed air line 6 is connected to several nozzles (not shown) provided in the base 5, so that several airflows may be initiated in the material container 2 and swirl the foam particles around, thereby separating them.

In the area of the base 5 of the material container 2, the conveyor pipe 4 is connected to the material container 2. Adjacent to the material container 2 in the conveyor pipe 4 is a blowing nozzle 8. The blowing nozzle 8 is connected by a further compressed air line 9 to the compressed air source 7. The compressed air supplied to the blowing nozzle 8 serves as blowing air, since it enters the conveyor pipe 4 through the blowing nozzle 8 and flows towards the mould 3. This creates a vacuum at the blowing nozzle 8 on the side facing the material container 2. This vacuum sucks foam particles out of the material container.

The conveyor pipe 4 opens out into a filling injector 10, which is connected to the mould 3. The filling injector 10 is connected to the compressed air source 7 by a further compressed air line 11. The compressed air supplied to the filling injector 10 is used on the one hand for filling the mould 3, while the flow of foam particles is pressurised by the compressed air in the direction of the mould 3. On the other hand, the compressed air supplied to the filling injector 10 may also be used for blowing back the foam particles from the conveyor pipe 4 into the material container 2, when the filling process at the mould 3 is concluded.

The mould 3 is formed of two mould halves 12, 13. Bounded by and between the two mould halves is at least one mould cavity 14, into which the filling injector 10 leads to introduce the foam particles. The volume of the mould cavity 14 may be reduced by moving together the two mould halves 12, 13. With the mould halves 12, 13 moved apart, a gap is formed between the mould halves 12, 13, which is described as the crack-split. Such a mould 3 is therefore also described as a crack-split mould. The two mould halves 12, 13 have valves 28, 29, which may be actuated by a control device (not shown). The valves 28, 29 are arranged on a communicating link between the mould cavity 14 and the environment, so that gas may escape from the mould cavity 14 in a controlled manner.

The mould may also have several mould cavities, which may be controlled as far as possible independently of one another in respect of filling, compaction and/or heating.

The two mould halves 12, 13 are connected by steam lines 15, 16 to a steam generator 17, for feeding steam into the mould cavity 14 for welding the foam particles introduced into the latter.

The steam generator 17 is connected by a steam line 18 to the material container 2, in order to supply the latter with steam. A further steam line 19 leads from the steam generator 17 to the blowing nozzle 8, so that steam may be fed to the flow of foam particles.

A steam line 20 connects the steam generator 17 to the filling injector 10, so that steam may be fed to the flow of foam particles passing through the filling injector 10.

There is provided a steam line 21 which leads from the steam generator 17 to the conveyor pipe 4 wherein, at a suitable connection point 22 in the conveyor pipe 4 an injection nozzle (not shown) is provided to feed steam into the conveyor pipe 4.

Provided in the steam lines and compressed air lines are pneumatically or electrically controllable valves (not shown), so that the amounts of compressed air or steam supplied may be controlled exactly by a control device (not shown).

The mode of operation of he apparatus 1 shown in FIG. 1 will be explained below.

To fill the mould, air is blown through the compressed air line 6 in the area of the base 5 of the material container 2, so that the foam particles contained therein are swirled around and separated. At the same time, blowing air is supplied to the blowing nozzle 8, so that foam particles are sucked into the conveyor pipe 4 from the material container 2 and conveyed by the blowing air in the direction of the mould 3. During filing, the valves 28, 29 are opened, so that air can escape.

Via the steam line 18, steam is fed from the steam generator 17 to the material container 2. The steam is dry saturated steam, which is fed to the material container 2 at the pressure (approx. 1 bar) prevailing in the material container 2. Preferably the steam in the material container 2 is injected into the material container 2 adjacent to the connection point of the conveyor pipe 4, so that the foam particles sucked into the conveyor pipe 4 are wetted by the steam.

A further feeding of steam to the flow of foam particles is effected at the blowing nozzle 8, at the connection point 22 and at the filing injector 10.

The temperature of the dry saturated steam is set by the boiling point curve of the steam and thus preset by the prevailing pressure. At a pressure of around 1 bar in the conveyor pipe 4, the temperature of the saturated steam is approx. 100° C.

The amount of steam should be so measured that the foam particles are not activated at their surfaces and do not weld together in the conveyor pipe 4. In the case of foam particles based on polyurethane, their welding temperature is around 80° C. to 130° C., depending on the material composition used. The amount of steam must therefore be so measured that the foam particles do not reach a temperature of 90° C. or more along the conveyance path from the material container 2 to the mould 3.

If the steam comes into contact with the foam particles, then the steam condenses on the surface of the foam particles, since these are colder, and forms a thin liquid film. This liquid film reduces the adhesion forces between the foam particles and increases their surface slip. By this means, the risk of the foam particles adhering to one another and/or forming lumps is considerably reduced and reliable conveyance of the particles through the conveyor pipe 4 is ensured.

Through the feeding of steam at several points along the conveyance path it is possible on the one hand to keep the local heat input at the respective feed point of steam sufficiently low to avoid activation of the foam particles, and on the other to ensure that the foam particles are adequately wetted with moisture along the entire conveyance path. In this way the foam particles may be fed reliably to the mould cavity 14 of the mould 3.

After the filling of the mould cavity 14 with foam particles, the filling injector 10 and the valves 28, 29 are closed. The compressed air fed to the filling injector 10 is used to blow back into the material container 2 the foam particles present in the conveyor pipe 4. During the blowing-back, preferably a fluidisation flow is fed into the material container 2. This results in a considerable reduction of blockages in the conveyance path.

Through moving the two mould halves 12, 13 together, the volume of the mould cavity 14 is reduced and the foam particles contained therein are compacted, Next, steam, in particular dry, hot or saturated steam, is fed into the mould cavity 14 through the lines 15, 16, in order to weld together the foam particles contained therein. The feeding of steam may also take place during the moving together and compaction of the foam particles. The feeding of steam is effected preferably first of all with the mould cavity open (crack-split or open valve), so that the air present in the spandrel spaces is displaced and completely replaced by steam. During split steaming, the material is already partly to completely welded, depending on the formulation. In split steaming, preferably a sealed, telescopic crack-split mould is used. Steam conducts heat better than air, leading to a faster and more even welding of the foam particles.

The feeding of steam into the mould cavity 14 is effected preferably by cross steaming from at least one side. In particular, the cross steam is introduced into the mould cavity 14 from two opposite sides, forming back pressure. The pressure on one moving and fixed side of the mould is actively built up simultaneously by opening the steam valves on the moving and fixed side. By this means the particles are first of all somewhat compressed, so that spandrels are formed and the particle charge material is permeable to steam. The necessary through flow is generated, as with conventional cross steaming, through different pressures on the moving and fixed side. Via the pressure difference and the pressure level, temperature degree of compression of the particles and steam flow, i.e. the energy input into the material, are controlled. Preferably the steam valves on the moving and fixed side are at least partly opened simultaneously, since otherwise the steam required on the back-pressure side flows through the moulded part owing to condensation on cold mould walls and volume filling, and welds the surface before the particles can be compressed by the pressure build-up, and the desired spandrels can no longer be created.

Steaming with vacuum (<0.5 bar absolute pressure) in the mould has turned out to be a further advantageous steaming variant. For this, the vacuum is built up in the mould before the first steaming stage, and is followed by a cross steaming stage. The reduced air quantity between the particles ensures good heat transfer. Due to the additional pressure gradient of around 0.5 bar it is also possible for steam to flow through and weld eTPU which has already been mechanically compressed (e.g. through crack-split filling or counter-pressure filling). Moreover, the steam temperature remains sufficiently low, so that the outer skin of the moulded part is not prematurely welded gas-tight, before the inner areas are welded.

In the case of high compaction of the foam particles in the mould, it may also be expedient to apply a vacuum to at least one side of the mould during steaming. Preferably the vacuum is applied to the side opposite the side at which the steam is fed to the mould.

After welding of the foam particles to form a foam particle part, the supply of steam is turned off, the mould is cooled down and opened for removal of the foam particle part.

The process then recommences with the filling of the mould cavity 14 with foam particles.

The embodiment described above has four points at which steam is added to the foam particles. These are the material container 2, the blowing nozzle 8, the connection point 22 and the filling injector 10. Within the scope of the invention it is also possible, of course, to vary the number and location of points at which steam is added to the foam particles along the conveyance path. This depends especially on the individual conveyance parameters (diameter of the conveyor pipe 4, chemical composition of the foam particles, speed of conveyance, pressure of the blowing gas, number of curves or constrictions in the conveyor pipe 4, etc.). It may therefore be expedient to add steam at only a single point, in particular the material container 2 or the blowing nozzle 8. On the other hand it may also be expedient to provide several connection points in the conveyor pipe 4, at which in each case a steam line is connected.

FIG. 2 shows a second embodiment of an apparatus 1 for the production of a foam particle part. Components which are identical to those in the first embodiment are provided with the same reference numbers and are not described again in detail.

This apparatus has a silo container 23 for storing the foam particles, a conditioning pressure vessel 24 and a buffer storage pressure vessel 25. Between the silo container 23 and the conditioning pressure vessel 24 is a first conveyor pipeline 26 to convey the foam particles from the silo container 23 into the conditioning pressure vessel 24. A second conveyor pipeline 27 leads from the conditioning pressure vessel 24 to the buffer storage pressure vessel 25, in order to convey foam particles conditioned in the conditioning pressure vessel from the conditioning pressure vessel 24 to the buffer storage pressure vessel 25. From the buffer storage pressure vessel 25, a conveyor pipe 4 leads to a mould 3. The buffer storage pressure vessel 25 thus acts as material container, from which the foam particles are conveyed by means of the conveyor pipe 4.

Provided once again in the conveyor pipe 4 are a blowing nozzle 8, a connection point 22 and a filling injector 10, designed and arranged just as in the first embodiment. The mould 3 is again comprised of two mould halves 12, 13, while the mould 3 must not necessarily be a crack-split mould. Preferably it is in the form of a mould with a static mould cavity 14, with a volume which cannot be changed in the closed state of the mould. Each of the two mould halves 12, 13 have valves 28, 29 which, for pressure filling, are in the form of pressure valves 28, 29, which limit the pressure in the mould cavity 14 to a specific value, i.e. gas escapes from the pressure valves 28, 29 when a certain pressure is exceeded in the mould cavity. Such a mould allows the filling of the mould cavity 14 using counter-pressure, as will be explained in detail below.

The apparatus 1 again has a steam generator 17 which, exactly as in the first embodiment, is connected by means of steam lines 15, 16, 18-21 to the mould 3 or the buffer storage pressure vessel 25, the blowing nozzle 8, the connection point 22 and the filling injector 10.

Also provided is a compressed air source 7 which, by means of a compressed air line 6 feeds compressed air to the buffer storage pressure vessel 25 for swirling the foam particles around. It also supplies blowing air to the blowing nozzle 8 by means of a compressed air line 9, and blowing or filling air to the filling injector 10 through a compressed air line 11.

Furthermore, the conditioning pressure vessel 24 and the buffer storage pressure vessel 25 are connected via compressed air lines 30, 31 to the compressed air source 7, in order to set a predetermined pressure in each of the two vessels 24, 25.

The mode of operation of the apparatus 1 for production of a foam particle part is explained below.

The foam particles are held in the silo container 23. From the silo container 23, the foam particles are conveyed via the first conveyor pipeline 26 to the conditioning pressure vessel 24. In the conditioning pressure vessel 24, the foam particles are put under pressure, with the final pressure around 2-5 bar. Here the pressure is increased gradually over a period of for example 2-6 hours, and then held over a period of 2-24 hours. Through a slow pressure build-up in the conditioning vessel, air/gas diffuses into the foam particles. The pressure rise is set to be small enough that the foam particles are not compressed so quickly or so strongly that they obtain a "raisin-like" wrinkled surface and are difficult to convey. With the conditioning, an internal pressure is built up in the particles, which subsequently during welding in the mould acts as a blowing agent and expands the foam particles. Due to the conditioning, the foam particles may be compressed into a smaller volume. Through the gradual increase in pressure and the holding of pressure over a longer period of time, the foam particles obtain a smooth surface in the compressed or conditioned state.

The conditioned foam particles are conveyed into the buffer storage pressure vessel 25 via the second conveyor pipeline 27. Connected at the base 5 of the buffer storage pressure vessel 25 is the conveyor pipe 4. Provided adjacent to this connection point are nozzles, which are pressurised with compressed air via the compressed air line 6, in order to provide several compressed air flows in the buffer storage pressure vessel 25. By this means, the conditioned foam particles are swirled around and separated.

From the buffer storage pressure vessel 25, the foam particles are conveyed away, as in the first embodiment, via the conveyor pipe 4 and fed to the mould 3. Here, just as in the first embodiment, blowing air is fed to the blowing nozzle 8 and the filling injector 10.

In a similar manner to the first embodiment, steam is fed to the conditioned foam particles in the buffer storage pressure vessel 25 at the blowing nozzle 8, the connection point 22 and the filling injector 10.

The second embodiment differs from the first embodiment in that the mould cavity 14 of the mould 3 has already assumed its final shape or its final volume during the filling with foam particles. In addition, the second embodiment differs from the first embodiment in that the pressure valves 28, 29 only allow air or gas to escape from the mould cavity 14 when it has a pressure lying above the predetermined limit pressure. This limit pressure is preferably so set that it is around 0.2 bar to 2 bar less than the pressure in the buffer storage pressure vessel 25. In particular, this limit pressure is around 0.5 bar to 1 bar less than the pressure in the buffer storage pressure vessel 25. This creates and exactly sets a pressure gradient between the buffer storage pressure vessel 25 and the mould cavity 14 of the mould 3, and there is a pressure drop along the conveyor pipe 4, which effects the conveyance of the foam particles. The pressure in the buffer storage pressure vessel 25 lies preferably in the range of 3 to 5 bar. This results in a pressure of around 1.5 to 4.5 bar in the conveyor pipe 4. The pressure in the pressure line depends on the one hand on the location in the pressure line. The further removed is a section of the pressure line from the buffer storage pressure vessel 25, the lower the pressure. On the other hand, the pressure in the pressure line depends on the pressure set in the buffer storage pressure vessel 25.

Since the foam particles are conveyed under pressure, they retain their small, compressed shape and their low volume. As a result, the number of collisions of the foam particles during conveyance in the conveyor pipe 4 is less than for a substantially unpressurised conveyance of the same number of foam particles per unit of time. Since the number of collisions is reduced by this type of pressure filling, also known as counter-pressure filling, the risk of lump-forming or sticking together of several foam particles is reduced. The higher the pressure in the conveyor pipe 4, the less the risk of the conditioned foam particles forming lumps with one another and blocking the conveyance path in the mould cavity 14.

When the mould cavity 14 is filled completely with foam particles, then the filling injector 10 is closed. The foam particles remaining in the conveyor pipe 4 are conveyed back into the buffer storage pressure vessel 25, exactly as in the first embodiment.

The pressure valves 28, 29 or other valves (not shown in FIG. 2) are opened, so that the pressure in the mould cavity 14 falls to the ambient pressure. This causes the foam particles, which are under pressure, to expand and stretch, leading to a uniform compaction of the foam particles in the mould cavity 14. Simultaneously or afterwards, the mould cavity 14 may be pressurised with steam, in order to weld the foam particles together into a foam particle part.

Since the individual foam particles have already been preheated during conveyance through the conveyor pipe 4 by the addition of steam, the time needed to weld the foam particle part may be reduced, as compared with conventional apparatus. This reduces considerably the cycle time of the whole apparatus.

In the second embodiment too, the foam particles are first of all separated, and mixed with steam to reduce adhesion and improve surface slip. In comparison with the first embodiment they are additionally conveyed under pressure to the mould 3, so that the size of the foam particles is kept small during conveyance.

The steam is to be fed at the individual points along the conveyance path in each case at the pressure existing in the respective section of the buffer storage pressure vessel 25 or of the conveyance path. Since the steam is a dry saturated steam, the temperature of the steam is to be set corresponding to the pressure preset by the boiling point curve of the steam. The temperature of the steam lies roughly in the range of 115 to 140° C. Owing to the high temperature of the steam, the amount of steam to be supplied should be metered precisely, so that the foam particles are not activated in the buffer storage pressure vessel or along the conveyance path, and do not weld together. It is therefore advantageous if the steam is added to the conditioned foam particles at several points along the conveyance path.

In the case of a short conveyance path and/or conveyor pipes of large diameter and/or few curves or constrictions, it is of course sufficient for the steam to be added at only one point.

After welding of the foam particles into a foam particle part, the mould 3 is cooled down and the two mould halves 12, 13 are separated to release the foam particle part.

In the embodiment explained above, a mould 3 with static mould cavity 14 is used, with its volume not changing during the filling with foam particles and the welding of the latter into a foam particle part. Within the scope of the invention it is also possible to use a crack-split mould, the mould cavity of which has a variable volume. To create counter-pressure, the mould halves of this mould are preferably sealed. Since the mould cavity is filled with conditioned foam particles, it is not necessary to move the two mould halves 13, 14 together over a long distance, since on account of the pressure filling, the mould cavity already contains a high density of foam particles.

Since with this apparatus, the risk of the foam particles forming lumps and blocking the conveyor pipe is small, foam particle parts of polyurethane-based foam particles may be produced reliably. The wastage rate is low and the cycle time of the apparatus is high. In this way, foam particle parts from foam particles passed on polyurethane may be produced cost-effectively as a mass product.

LIST OF REFERENCE NUMBERS 1 apparatus
2 material container
3 mould
4 conveyor pipe
5 base
6 compressed air line
7 compressed air source
8 blowing nozzle
9 compressed air line
10 filling injector
11 compressed air line
12 mould half
13 mould half
14 mould cavity
15 steam line
16 steam line
17 steam generator
18 steam line
19 steam line
20 steam line
21 steam line
22 connection point
23 silo container
24 conditioning pressure vessel
25 buffer storage pressure vessel
26 first conveyor pipeline
27 second conveyor pipeline
28 pressure valve
29 pressure valve
30 air pressure line
31 air pressure line

The invention claimed is:

1. A method of producing a foam particle part, comprising the following steps:
   feeding of foam particles made of expanded thermoplastic polyurethane from a material container by means of a pipe to a filling injector lying upstream of a mold in a direction of conveyance, which is coupled to a mold, wherein the foam particles are conveyed in the pipe by means of a blowing gas, wherein an amount of directed steam allows a thin film of condensed water to form on a surface of the foam particles to sufficiently lower an adhesion effect of the foam particles and while the added steam is limited so that an amount of heat may not be excessively so that the surfaces of the foam particles are activated, and
   thermoplastic welding of the foam particles made of expanded thermoplastic polyurethane in the mold to make a foam particle part with input of heat, wherein steam is added to the foam particles to be fed, so as to humidify the same during their transport from the material container to the mold, during which steam is brought into the pipe by means of an injector nozzle and/or a propulsion nozzle located downstream the material container in a transport direction.

2. The method according to claim 1, directing the foam particles from the material container to the mold along a conveyance path, wherein steam is added to the foam particles at more than one point along the conveyance path.

3. The method according to claim 1, wherein the steam is added to the foam particles in one of the following: at a blowing nozzle located downstream of the material container in the direction of conveyance, at a filling injector lying upstream of the mold in the direction of conveyance, and at a section of the pipe.

4. The method according to claim 1, wherein steam for conveyance is added in one of the following conditions: at a temperature in the range of between about 100 and about 140° C. and at a pressure in the range of between about 1 bar and about 5 bars.

5. The method according to claim 1, wherein the foam particles are conditioned under increased pressure and the conditioned foam particles are fed to the material container and there held under a pressure in the range of about 2 and about 5 bars.

6. The method according to claim 5, wherein the pressure in the pipe and in the mold are set so that, during feeding of the foam particles into the mold, the pressure in the pipe and in the mold is lower than in the material container in the range of between about 0.2 and about 2 bars in the mold.

7. The method according to claim 1, wherein the foam particles are separated from each other in the material container, wherein the separation is effected by feeding of a flow of a gas.

8. The method according to claim 1, wherein the foam particles contain a blowing agent.

9. The method according to claim 8, wherein the blowing agent is selected from one of the following: pentane, butane, carbon dioxide, azocarbonamide and toluene-p-sulphonic acid hydracite.

10. The method according to claim 1, wherein the foam particles are coated with a lubricant.

11. The method according to claim 1, wherein the pipe or the mold or both are moved during filling.

12. The method according to claim 1, wherein a lubricant is blown into the foam particles to be conveyed.

13. The method according to claim 12, wherein the lubricant is selected from the following: dust and powder.

14. The method according to claim 1, wherein the blowing gas is selected from the following: air and an inert gas.

15. A method for producing a particle-foam part, comprising:
   supplying steam to foam particles made of expanded thermoplastic polyurethane;
   conveying through a pipe said foam particles from a material container to a filling device, wherein the foam particles are conveyed by a blowing gas and said foam particles are wetted with steam during their transfer from the material container to a mold during which steam is directed into the pipe through an injector nozzle, a propulsion nozzle or both, which is located downstream at more than one point along a conveyance path from the material container and upstream of the mold in a direction of conveyance, wherein the added steam allows a thin film of condensed water to form on surfaces of foam particles to sufficiently lower an adhesion effect of the foam particles while sufficiently limiting the amount of steam so that added heat does not activate said surfaces of the foam particles;
   and thermoplastic welding of the foam particles made of expanded thermoplastic polyurethane in the mold to make a particle-foam part with input of heat.

16. A method for producing an expanded thermoplastic polyurethane particle-foam part, comprising:
   supplying steam to thermoplastic polyurethane foam particles;
   conveying through a pipe said foam particles from a material container to a filling injector, which is coupled to a mold and said filling injector lies upstream of the mold in a direction of conveyance, wherein the foam particles are conveyed by a blowing gas and said foam particles are wetted with steam during their transfer from the material container to the mold during which steam is directed into the pipe through an injector nozzle, a propulsion nozzle or both, which is located downstream from the material container and upstream of the mold in the direction of conveyance, wherein the added steam allows a thin film of condensed water to form on a surface of foam particles to sufficiently lower an adhesion effect of the foam particles while sufficiently limiting the amount of steam so that added heat does not activate the surfaces of the thermoplastic polyurethane foam particles; and
   thermoplastic welding of the foam particles in the mold to make a thermoplastic polyurethane particle-foam part with input of heat.

\* \* \* \* \*